Figure 1:
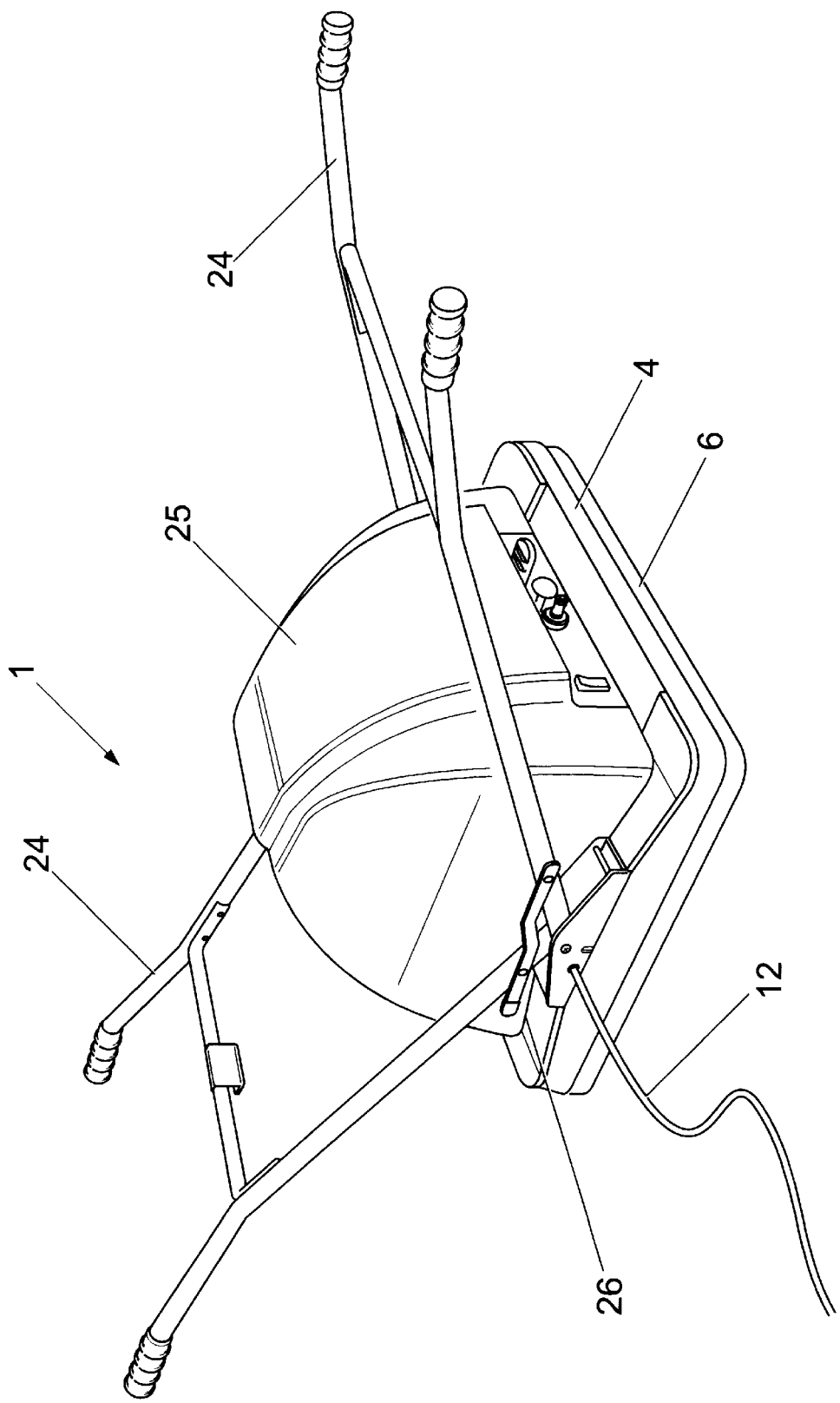

United States Patent [19]
Brewer

[11] Patent Number: 6,095,581
[45] Date of Patent: Aug. 1, 2000

[54] VACUUM LIFTING DEVICE

[75] Inventor: Leslie Brewer, Fife, United Kingdom

[73] Assignee: Largo Landscapes, Scotland

[21] Appl. No.: 09/082,272

[22] Filed: May 20, 1998

[30] Foreign Application Priority Data

May 20, 1997 [GB] United Kingdom ............. 9710166

[51] Int. Cl.[7] ................................................. B66C 1/02
[52] U.S. Cl. ........................................................ 294/64.1
[58] Field of Search ................... 294/64.1, 65; 269/21; 279/3; 414/627, 737, 752

[56] References Cited

U.S. PATENT DOCUMENTS

| | | | |
|---|---|---|---|
| 3,055,694 | 9/1962 | Billner | 294/65 |
| 3,313,568 | 4/1967 | Fogg | 294/64.1 |
| 3,387,718 | 6/1968 | Roth et al. | 294/64.1 X |
| 3,497,254 | 2/1970 | Lutolf et al. | 294/64.1 |
| 3,751,095 | 8/1973 | Myles | 294/64.1 |
| 4,466,764 | 8/1984 | Hutter | 294/64.1 X |
| 4,925,225 | 5/1990 | Dost | 294/64.1 |
| 5,330,314 | 7/1994 | Bennison | 294/64.1 X |
| 5,752,729 | 5/1998 | Crozier et al. | 294/64.1 X |

*Primary Examiner*—Johnny D. Cherry
*Attorney, Agent, or Firm*—Ratner & Prestia

[57] ABSTRACT

A device to facilitate lifting and repositioning of articles, suitably materials of slab-like construction, the device comprising a vacuum source, a housing and a sealing joint, preferably made of soft-seal material, on the base of the housing which, in use, will contact the article being lifted.

9 Claims, 4 Drawing Sheets

VACUUM LIFTING DEVICE

This invention relates to a device for lifting, moving and positioning materials of slab-like construction. In particular, the invention relates to a device for lifting, moving and positioning of slabs of construction materials.

In the construction trade the use of slabs of construction materials, eg concrete slabs, paving stones and the like, is commonplace. These slabs are generally quite large (3'×2'× 2" or about 90 cm×60 cm×5 cm) and heavy (200 lbs or about 90 kg) thus making manual lifting, moving and positioning of these slabs very difficult. This is particularly the case where slabs are placed on a flat surface, eg the ground or the back of a lorry, where it is very difficult to get a good grip of a slab.

Where, for example, a patio or path or the like is being constructed, then it is generally very difficult to move and/or lay the slabs into position, as the spaces where the slabs are to be placed are generally closely bounded by other slabs which have already been moved into position. Thus, placing the slabs into position often involves the risk that the person doing this may trap or injure their fingers.

Further, once in place, it is very difficult to manually maneuver the slabs without using some lever means which is time consuming and may also damage the slab.

There are currently available two types of slab lifting devices:

i) mechanical
ii) vacuum

The mechanical devices generally require mechanical "fingers" to grip the edges and/or the underside of a slab, which can then be lifted, moved and positioned. However, as the slabs are generally large and heavy, the "fingers" of the device must have sufficient mechanical strength to perform the functions of gripping, moving and positioning of the slabs, which therefore require that the fingers are strong. As mentioned above, the spacing between slabs is generally quite small and as such the "fingers" of the mechanical devices are generally too thick to fit into these spaces for the positioning of the slabs.

The second type of slab lifter device operates using a hard vacuum which is formed between the device and a slab. Devices of this type require that a near perfect hermetic seal is formed between the appropriate part of the device and a slab. However, this form of device is usually only suitable for smooth-surfaced and dust-free materials, and cannot be used for most rough-surfaced slabs since forming a perfect seal is very difficult if not impossible in these cases. This type of device also requires a separate pump and is often large and of reduced mobility.

The present invention overcomes all of these deficiencies by providing a means for lifting, moving and positioning materials such as slabs without the need for a hard vacuum or mechanical devices as described hereinbefore. Additionally, the invention provides a device which is relatively lightweight and can be operated by one or two people. The device does not require additional equipment such as external vacuum pumps and will allow slabs to be closely laid in one operation without any additional maneuvering of the slabs by levers, etc.

According to the present invention there is provided a device to facilitate lifting and repositioning of articles, suitably of slab-like construction, the device comprising a vacuum source, a housing and a sealing joint, preferably made of soft-seal material, on the base of the housing which, in use, will contact the article being lifted.

More particularly, the present invention provides a vacuum lifting device to facilitate the lifting and repositioning of an article having an external surface. This device comprises:

(a) a base member having an aperture, a top surface and a bottom surface; the bottom surface being provided with a continuous sealing joint projecting downwardly from the bottom surface and defining an enclosed area on the bottom surface of the base member and which includes the aperture; and (b) vacuum generating means driven by actuating means and having a suction opening. The vacuum generating means is provided directly on the top surface of the base member and the suction opening is sized and shaped so as to cover the whole aperture of the base member.

The base member is sized and shaped so that it's bottom surface can be positioned on top of a portion of the external surface of the article to be lifted and so that the sealing joint contacts a portion of the external surface of the article, so that said sealing joint, said enclosed area and said external surface of the article define a vacuum chamber.

It is also an object of the invention to provide a method to facilitate the lifting of an article having an external surface. Such a method includes the steps of:

a) providing a vacuum lifting device of the type according to the invention as above described;

b) positioning the base member on the top of the external surface of the article to be lifted;

c) actuating the vacuum generating means in a continuous manner;

d) establishing a vacuum between the article and said device sufficient to support the weight of said article when lifted; and e) moving the device and the article.

With respect to the vacuum lifting device of the invention, means may be attached to the housing for lifting or moving the device, and the vacuum source can comprise a motor and, for example, a fan optionally located on the housing.

In use, the device is placed on a slab of material and the pressure within the housing is reduced by switching on the vacuum; the soft-seal material aids the formation of a vacuum by conforming to any irregularities on the slab surface; where the pressure is sufficiently reduced, the device and slab may be lifted and/or moved, the slab is released by switching off the motor and fan.

The fan and the motor, when in operation, form a large volume, low pressure vacuum compressor.

The motor may typically have a power output in the range of 250–2500 watts, although larger motors can be used in scaled-up versions to manipulate very large slabs, etc.

Typically, the pressure within the housing once evacuated by the motor and fan is in the range of 0.05 to 0.40 bar or 0.72 to 5.80 p.s.i. or $0.5 \times 10^4$ to $4 \times 10^4$ Pa.

Preferably, the pressure is in the range of 0.10 to 0.30 bar or 1.45 to 4.35 p.s.i. or $1 \times 10^4$ to $3 \times 10^4$ Pa.

Most preferably, the pressure is 0.15 bar or $1.5 \times 10^4$ Pa or 2.2 p.s.i.

The housing can be of any suitable dimensions such that it covers an area in the range of 100 to 500 square inches or about $6 \times 10^{-2}$ to $34 \times 10^{-2}$ $m^2$.

Preferably, the housing covers an area of 300 square inches or approximately 20 $dm^2$.

The housings can be constructed from steel, aluminum or plastic of any other suitable material.

The soft-seal material can be of any material with similar physical and mechanical properties to foam rubber.

Preferably, the soft-seal material is foam rubber.

The means for lifting and/or moving the device can be handles positioned on the top or the sides of the housing.

In another aspect of the present invention the means for lifting and/or moving the device can be a framework attached to the housing wherein the framework is provided with one or more wheels and one or more handles.

Preferably, the framework is of a construction similar to that of a wheel-barrow frame.

In use, a device of the second aspect of the present invention could be positioned above the slab, sealed thereto, and when a sufficient vacuum had formed, the device and slab could be lifted by the handles provided and wheeled away by one person.

In a second embodiment of the present invention, the device is provided with a removable flexible pipe which is attached to an outlet of the motor and fan of the device.

The pipes can be 2 to 5 meters in length and 2.5 to 10 centimeters in diameter.

The flexible pipe is constructed from plastic or any other suitable material.

At one open end of the pipe there is provided a layer of soft-seal material to aid the formation of a soft-seal between the pipe and the slab.

In use, the pipe is placed against a slab and the motor and fan switched on. Once a vacuum has formed, the slab can be lifted and moved. The slab can be released by switching off the fan and motor.

The present invention will now be further described by way of example and with reference to the accompanying Figures, in which:

FIG. 1: illustrates a perspective view of a preferred embodiment of the invention.

Figure 2:
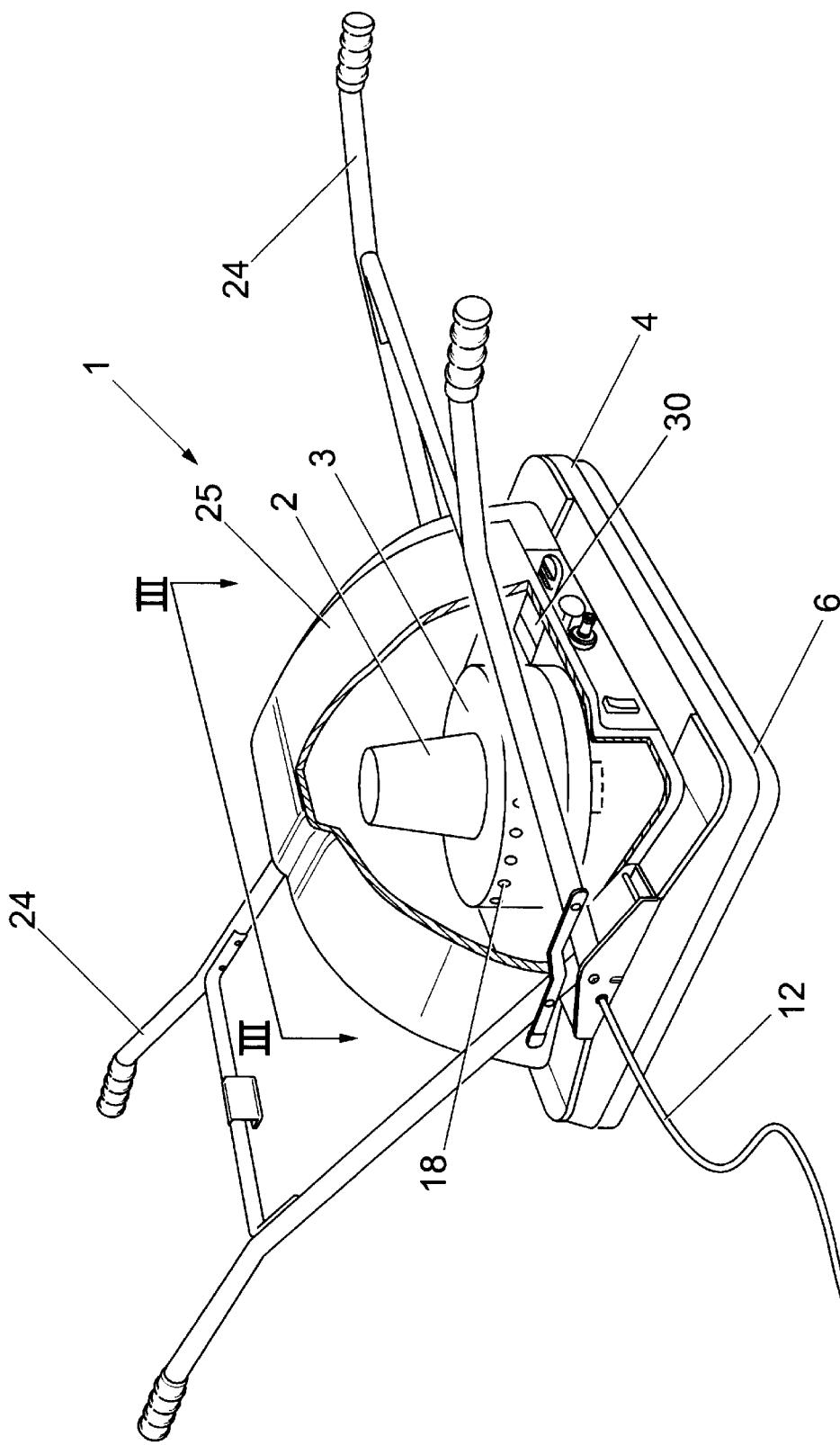

FIG. 2: is a partially sectioned view of FIG. 1 showing the interior of the housing.

Figure 3:
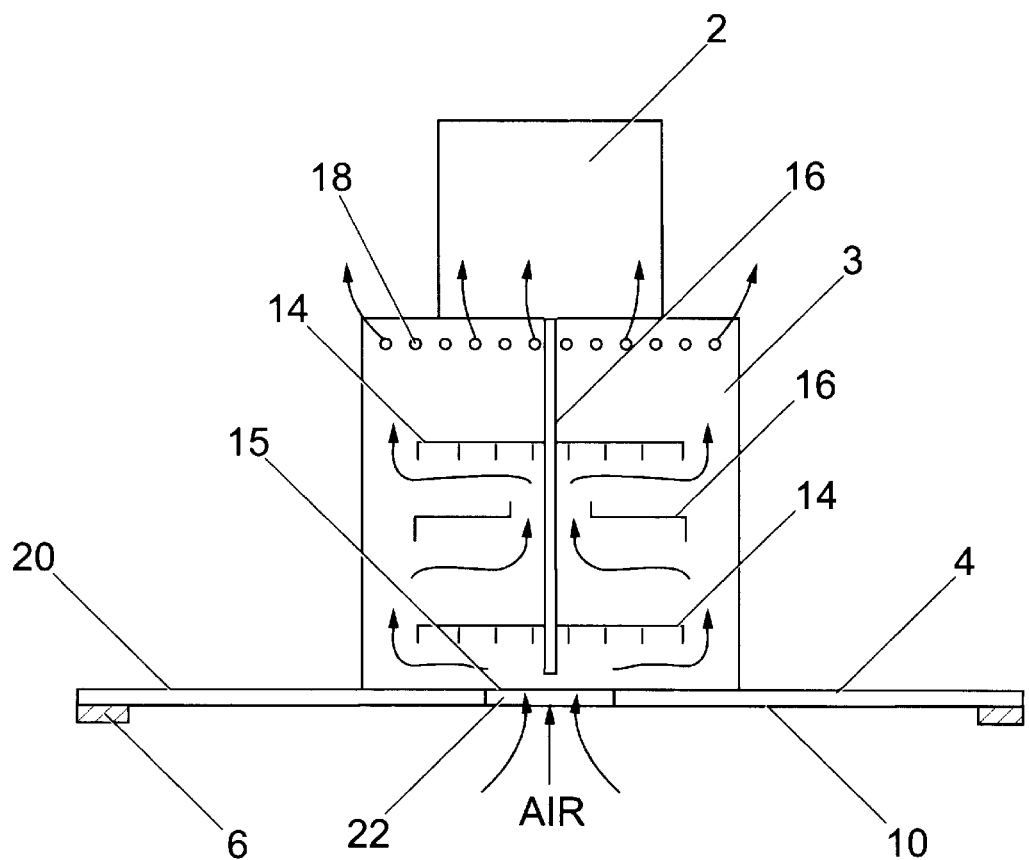

FIG. 3: is a partial schematic cross-sectional view taken on line III—III of FIG. 2.

Figure 4:
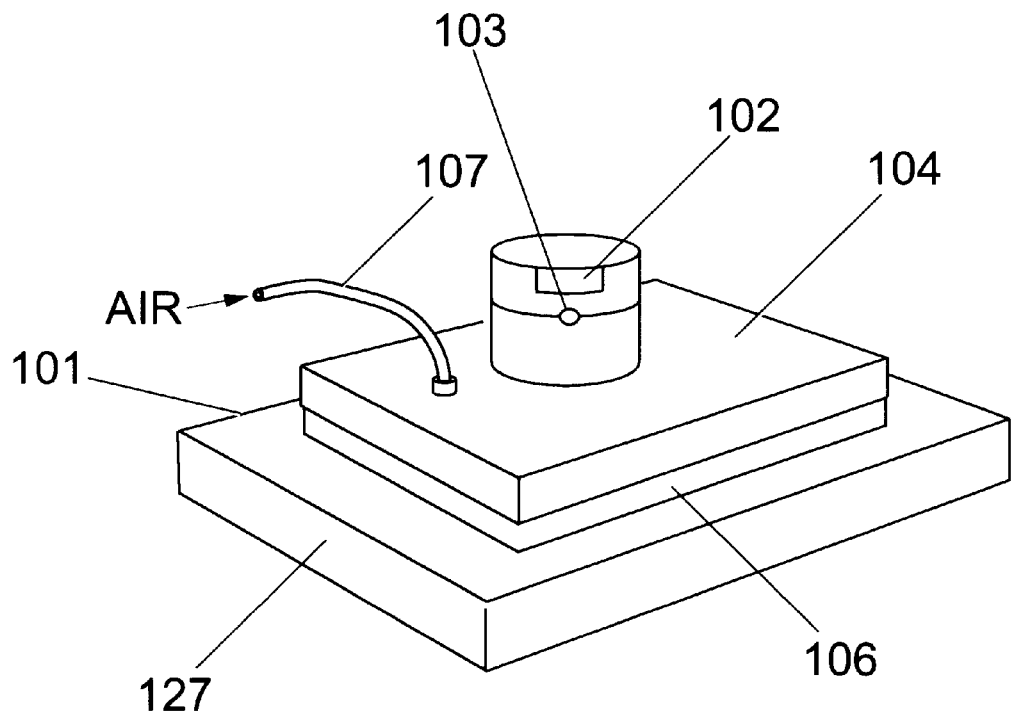

FIG. 4: illustrates another embodiment of the invention optionally provided with a pipe attachment.

A preferred embodiment of the vacuum lifting device is shown in FIGS. 1 to 3. As shown in FIG. 2 the vacuum lifting device 1 has a motor 2 to act as an actuating device and a vacuum generating device 3 positioned on top of a base member 4. A sealing joint 6, preferably of a soft, seal material, is attached to the base member 4 around its bottom surface 10 (shown in FIG. 3).

In FIG. 3 is shown a schematic and partial representation of the vacuum generating device 3 and the base member 4 only. The motor 2 is of any kind known in the art and is advantageously positioned on the top of the vacuum generation device.

Preferably, the power output of the motor 2 is 1000 watts but a different motor may be used, in particularly for jobs where the power requirement is greater. Thus a different motor may be used according to needs (ie a 2500 watt may be used for particularly heavy lifting requirements or where a poor vacuum seal is achieved). Similarly, lower output motors (or high-power motors operated at reduced capacity) may be used for lighter jobs. Suitably, the power supply for the motor is any 110V or 240V portable or mains supply and is connected by the supply cable 12.

The motor 2 actuates a vacuum generating means 3. As shown on FIG. 3, this means 3 is advantageously a double stage centrifugal air compressor which comprises two vaned discs 14 attached to a shaft 16 which is driven by the motor 2 and revolved at high speed. The vacuum generating means 3 is provided with a suction opening 15 through which the air is driven into the device. The air encounters a first disc 14, which is revolving at high speed, and it is thrown out by centrifugal force and is directed by fixed vane 16 on the second revolving disc 14 where the process is repeated. Then, the compressed air is expelled through the vents 18 into the atmosphere.

It is important to note that, according to this particular embodiment, the vacuum generating device is directly attached, and preferably sealed, to the internal surface 20 of the base member 4.

The base member 4 may be constructed from any suitable material and is provided with an aperture 22 which is preferably central. Ideally, the material will be strong and robust. Suitable materials are steel, aluminum and plastics. The shape of the base member 4 depends on the shape of the article to be moved. The preferred embodiment shown in FIGS. 1 to 3 is designed to be a very efficient slab lifter. Therefore, it is preferred that the base member 4 as shaped like a plate, as best shown in FIG. 3. As it will be easily understood, the suction opening of the vacuum generating device 3 is positioned over the aperture 22 and is sized and shaped to cover it completely in order to give the best results.

The sealing joint 6 projects downwardly from the bottom surface 10 of the base member 4 and defines an enclosed area which includes the aperture 22.

Once of the basic concepts of the performance of this device is that it does not depend upon a complete vacuum, but only a differential of air pressure within the base, the seal of which does not necessarily give a completely hermetic seal against outside air pressure because of the rough nature of the surface encountered. However, to compensate for this, a large volume, low pressure vacuum compressor motor and fan are used to reduce the air pressure within the vacuum base and maintain the reduced air pressure by operating continually during the lifting procedure. Thus, the device according to the invention does not rely on a vacuum hose connected to a separate vacuum producing unit.

Using this principle, a reduced pressure within the pad of say 15% of 1 bar ($1 \times 10^5$ Pa) (14.5 p.s.i.) over an area of say 300 square inches ($19.3 \times 10^{-2}$ m$^2$) will give a lift of approximately 450 lbs (204 kg), more than double the lift required to raise a 3'×2'×2" or about 90 cm×60 cm×5 cm concrete slab.

In use, the device 1 shown on FIGS. 1 to 3 is placed on the surface of a slab of material so that the sealing joint 6 contacts as continuously as is possible a portion of the slab. The portion of the base member 4 enclosed by the sealing joint 6, this joint 6 and the slab surface define a vacuum chamber. The pressure within this vacuum chamber is reduced by switching on the motor 2 and the vacuum generating means 3; the sealing joint 6 is preferably made in a soft-seal material—which aids the formation of a vacuum by conforming to any irregularities on the slab surface; where the pressure is sufficiently reduced, the device and slab may be lifted and/or moved; the slab is released by switching off the motor.

Advantageously, the vacuum lifting device 1 further comprises a vacuum breaking valve 30 which allows a massive amount of outside air into the vacuum chamber while the motor 2 (and the compressor 3) is still running. This feature is advantageous since it obviates the need to switch off the motor when releasing the machine from its load and allows quick repetition of the lifting process with another slab. Such valves (or flat type valve) can be operated by foot or by hand. They are well known in the art and do not need to be described any further.

The device 1 can be lifted by handling means provided on or around the base member 4. As shown in FIGS. 1 and 2, such handling means may be a pair of symmetrical handles 24. In this embodiment, the device 1 is designed to be moved by 2 people, each of them manipulating one of the handles 24. Such handles are advantageously foldable when the device 1 is not in use.

Of course, the device 1 can be designed to be lifted and wheeled by means of a framework which is constructed around the device. The framework can have one or more wheels and one or more handles and is similar in construction to a wheel barrow frame. This framework when attached to the device would allow one person to use the invention as opposed to two people as required by the first aspect of the invention.

As shown in FIGS. 1 and 2 the device advantageously includes a housing 25 which can be in any suitable material (preferably in plastic) and which protects the motor 2 or the vacuum generating means 3. This housing may be provided on the base member 4 and is provided with venting opening 26 to allow the air compressed by the vacuum generating means 3 to be expelled.

The device 1 is lightweight and is easily maneuverable by one or two people. It can be produced in a range of sizes such that the base covers areas of 100 to 500 square inches ($6 \times 10^{-2}$ to $34 \times 10^{-2}$ m$^2$). Typically, the housing is of a rectangular shaped base, side and top.

The sealing joint 6 is preferably made of a soft-seal material which surrounds the bottom surface 10 of base member 4 but can be of any material with similar physical and mechanical properties to foam rubber.

Another embodiment of the invention is shown in FIG. 4. This embodiment provides a lifting device 101 which is further provided with a flexible pipe 107. The device 101 comprises a base member 104, and a vacuum generating means 103 actuated by a motor 102 of the type above described.

This device 101 is also specifically designed for moving a slab and, as can be seen from FIG. 4, the device 101 rests on top of a slab 127 of material. Typically, the slab 127 is a concrete slab or a paving stone.

Similarly, the removable flexible pipe 107 must be strong and robust yet light enough not to require a great deal of effort to handle. Suitable materials would include plastics and aluminum, although steel could be used where required.

The flexible removable pipe 107 is attached to the device 101 at an outlet of the motor 102 or of the vacuum generating means 103 or, as shown in FIG. 4, directly of the base member 104. The pipe 107 may be attached to the device 101, for example by a push-fit mechanism similar to a vacuum cleaner attachment. Any suitable alternative means of attachment may also be used, for example a thread and screw fitting, where the inside surface of the one end of the pipe is threaded, and an outlet point of the motor 102 and vacuum means 103 has a complementary screw fitting such that the pipe 107 can be screwed onto the outlet of the motor 102 or vacuum generating means 103.

At the other end of the pipe 107 is a soft seal ring (not shown) may be provided together with means to reversably close this end of the pipe 107 (not shown).

The pipe 107 enables small slabs or difficult to handle shaped slabs to be accurately moved and positioned with relative ease. If the outlet is provided at the top of the vacuum generating means 103, it is preferred that this means 130 and motor 102, are of a kind which can rotate in two directions. By reversing the direction for the motor 102 and compressor 103, a vacuum is created at an open end of the pipe 107 which can be used to pick up small slabs or difficult to handle shaped slabs.

If the pipe 107 is connected to the vacuum chamber through an outlet provided on the base member 104, a two direction motor 102/compressor 103 is not needed.

The slab 127 can then be moved and placed where required.

Modifications and improvements can be incorporated without departing from the scope of the invention.

I claim:

1. A vacuum lifting device to facilitate the lifting and repositioning of an article having an external surface, said device comprising:

(a) a base member having an aperture, a top surface and a bottom surface; said bottom surface being provided with a continuous sealing joint projecting downwardly from the bottom surface and defining an enclosed area, which includes said aperture, on the bottom surface of the base member;

(b) vacuum generating means driven by actuating means and having a suction opening, said vacuum generating means and suction opening being provided directly on the top surface of the base member and said suction opening being sized and shaped so as to cover the whole aperture of the base member; and (c) a vacuum breaking valve which when opened is able to permit a massive amount of outside air to move into said vacuum chamber;

said base member is sized and shaped so that its bottom surface can be positioned on top of a portion of the external surface of the article to be lifted and so that the sealing joint contacts a portion of the external surface of the article so that said sealing joint, said enclosed are and said external surface of the article define a vacuum chamber.

2. The device of claim 1, which further comprises handles, said handles being provided on the base member.

3. The device of claim 1, wherein the base member is a metallic plate.

4. The device of claim 1, wherein a housing to enclose and protect the vacuum and actuating means is provided on the base member.

5. The device of claim 1, wherein the vacuum means can evacuate air within the vacuum housing at a pressure which is in the range of 0.05 to 0.40 bar or 0.72 to 5.80 p.s.i. or $0.5 \times 10^4$ to $4 \times 10^4$ Pa.

6. The device of claim 1, wherein the vacuum means can evacuate air within the vacuum housing at a pressure which is in the range of 0.10 to 0.30 bar or 1.45 to 4.35 p.s.i. or $1 \times 10^4$ to $3 \times 10^4$ Pa.

7. The device of claim 1, wherein the vacuum housing is sized so as to cover an area in the range of 100 to 500 square inches.

8. The device of claim 1, wherein the sealing joint is made of foam rubber.

9. A method to facilitate the lifting of an article having an external surface, using a device having, (i) a base member having an aperture, a top surface and a bottom surface; said bottom surface being provided with a continuous sealing joint projecting downwardly from the bottom surface and defining an enclosed area, which includes said aperture, on the bottom surface of the base member;

(ii) vacuum generating means driven by actuating means and having a suction opening, said vacuum generating means and suction opening being provided directly on the top surface of the base member and said suction opening being sized and shaped so as to cover the whole aperture of the base member; and (iii) a vacuum breaking valve which when opened is able to permit a massive amount of outside air to move into said vacuum chamber, wherein said base member is sized and shaped so that its bottom surface can be positioned on top of a portion of the external surface of the article to be lifted and so that the sealing joint contacts a portion of the external surface of the article so that said sealing joint, said enclosed area and said external surface of the article define a vacuum chamber, said method including steps of:

a) positioning the base member on the top of the external surface of the article to be lifted;

b) actuating the vacuum generating means in a continuous manner;

c) establishing a vacuum between the article and said device sufficient to support the weight of said article when lifted; and d) moving the device and the article.

* * * * *